Fig. 1

Philip H. Klein &
Albert J. Zalecki
INVENTORS

Fig. 2

PHILIP H. KLEIN &
ALBERT J. ZALECKI
INVENTORS

PHILIP H. KLEIN &
ALBERT J. ZALECKI
INVENTORS

PHILIP H. KLEIN &
ALBERT J. ZALECKI
INVENTORS

United States Patent Office 3,495,808
Patented Feb. 17, 1970

3,495,808
AUTOMATIC BINDER MIX SYSTEM
Philip H. Klein and Albert J. Zalecki, Toledo, Ohio., assignors to Owens-Corning Fiberglas Corporation, a corporation of Delaware
Filed Aug. 29, 1967, Ser. No. 664,073
Int. Cl. B01f *15/00, 13/10*
U.S. Cl. 259—8                                                  51 Claims

ABSTRACT OF THE DISCLOSURE

Method and apparatus for mixing and supplying a final mixture of binder, size or the like which is subject to deterioration in quality after being mixed. Ingredients are continuously and sequentially combined in a manifold means to provide a continuously fresh supply for one or more application stations. A relatively small surge reservoir is maintained between the manifold and the application stations so that the binder may be continuously mixed or virtually continuously mixed while maintaining an ample surge supply to cover a varying demand. In the event that the demand becomes very small or ceases entirely for a predetermined period of time the ingredient combining in the manifold may be stopped, and the manifold may be flushed and cleaned while the surge storage will cover any demand for binder during a flush period.

---

It has been conventional practice in the formation of glass fibers or fibers of other mineral materials to deliver a binder containing resin and other ingredients onto the fibers, which are formed by attenuation through the use of high velocity attenuating blasts, and the fibers treated with binder collected in a mass upon a moving foraminous conveyor.

In the past a batch with the proper ratio of ingredients has been mixed in a tank with water. After mixing, the binder is drawn from the tank to supply individual applicator stations while a new batch is mixed in a second tank. When the first tank is emptied or substantially empty the supply for the individual applicator stations is obtained from the second tank. A new batch is then mixed in the first tank to be ready when the second tank is emptied. Binder is thus supplied by alternating between two or more tanks in which successive batches are mixed.

While the above method has permitted production there are some difficulties in that many binders, sizes or the like are subject to a deterioration in quality after being mixed, there may be a settling or separation of ingredients after being mixed, large batch mixing inevitably means a waste of material, etc.

Accordingly, it is an object of this invention to provide a new continuous mix method and system for preparing binder on the like in which the binder ingredients are fed into a manifold or other means continuously on a ratio basis. The preferred embodiment of the manifold is a mixing column having compartments therein into which the ingredients are placed in proper sequence for reaction between ingredients. Means are provided for thoroughly mixing the ingredients within a stage or compartment before the mixed ingredients are forwarded to the next stage or compartment for combination with the ingredient added at the successive stage.

This approach to the mixing of binder or the like has several advantages. There is always a fresh supply of binder. There is no settling of ingredients, therefore the binder is more uniform. Material is not wasted since a comparatively small amount is involved in continuously mixing on demand. The requirements for two systems is eliminated. The mixed binder is pumped from the manifold into a "finished" binder surge reservoir. The binder or "final mixture" in the surge reservoir is continuously circulated to and from individual applicator stations where the binder is applied to the fibers or filaments.

Other objects, advantages and features of this invention will become apparent when the following description is taken in conjunction with the accompanying drawings, in which.

Figure 1:
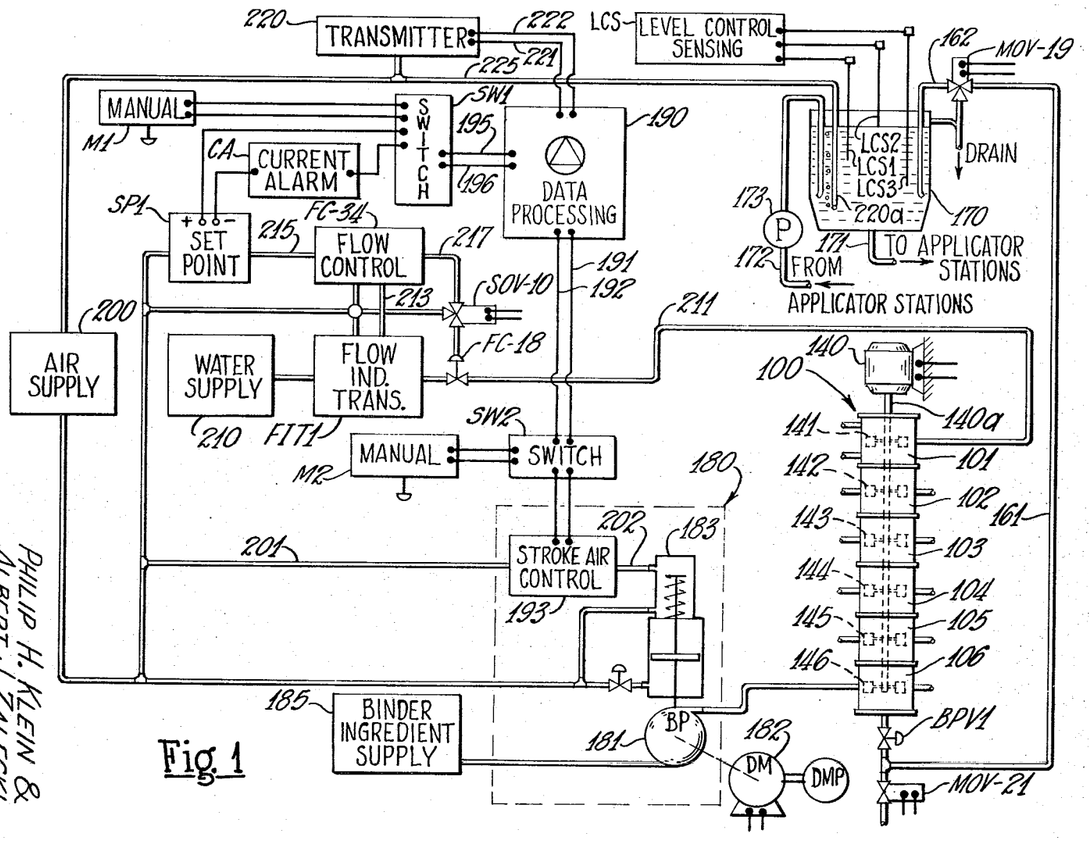
FIGURE 1 illustrates in block diagram form a first embodiment of the teachings of this invention.

In FIGURE 1 there is illustrated in block diagram form a complete system for the continuous mixing of a binder for supply to individual applicator stations.

The mixing manifold or column generally indicated at 100 (best seen in FIGURE 2) is divided into a plurality of compartments or stages 101, 102, 103, 104, 105, and 106 by a plurality of stationary, ring-shaped or annular baffles 121 through 125 which may be held or disposed in the positions shown within the column 100 by welding to the interior of the column or, preferably, by support upon two or more axially extending spacer legs (not shown) which support the outer rims of the stationary baffles 121 through 125 in spaced relationship within the column 100.

An agitator motor 140 is connected to drive an agitator drive shaft 140a on which are mounted paddles or blades 141 through 146, one or more for each of the compartments 101 through 106, respectively. The shaft 140a also supports rotary baffle means 131 through 135 which are secured to the shaft 140a so that the disc shaped baffles 131 through 135 are disposed on the same level and within the center of the ring-shaped, stationary baffles 121 through 125 to control flow between compartments. The blades or turbine paddle mixers 141 are shown symbolically both in FIGURE 1 and FIGURE 2, but may be any stirrer or agitator glade which thoroughly mixes the ingredient or ingredients within each compartment, preferably in the directions shown by the solid arrows indicating circulation of the material within the compartment 101. Water and binder ingredients are admitted to the compartments by means of one or more inlet valve means such as 151a, 151b, 151c, for compartment 101, through inlet valve means 156a, 156b, for compartment 106.

Figure 2:
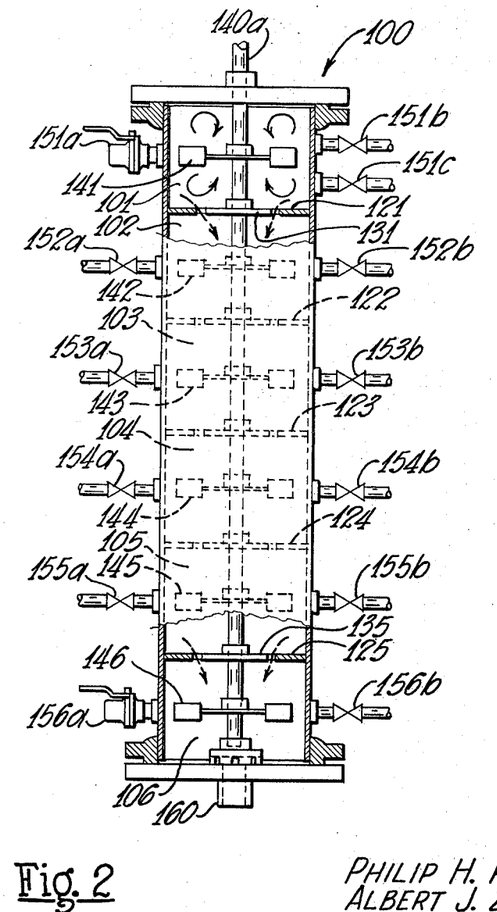
FIGURE 2 is a side elevational view, partially in section, of novel ingredient combining means suitable for use in the system of FIGURE 1.

The column 100 is preferably initially filled with water, pushing air out of the column, then the ingredients are added sequentially, starting from the top to prepare the mix continuously. Water is preferably added at the top so that the seal around the agitator shaft will not be exposed to the finished binder. As a further precaution in avoiding contamination between compartments, critical materials may be placed two sections apart.

Binder ingredients which may be used and where they are fed into the column for the proper interaction within an individual stage and proper sequential mixing of the ingredients as the binder moves through the column may be as follows. Water may be fed to compartment 101 via inlet valve means 151a while silicone and ammonium sulphate may be added to compartment 101 via valves 151b and 151c. A ten-second hold time in compartment 101 allows for the thorough mixing of the water and ammonium sulphate to adjust the pH control of the binder. Urea and a fire resistant resin may be added to compartment 102 via inlet valves 152a and 152b. One or more resins may be added to compartment 103 via inlet valves 153a and 153b. Ammonia or another base may be added to compartment 104 via inlet valve 154a to change the binder to slightly alkaline. If the binder is too acidic emulsions will drop out. An oil additive may be placed in compartment 105 via inlet valve 155a. Boric acid and a dye may be added to the binder in compartment 106 via values 156a and 156b.

As the ingredients are mixed within each compartment the continuing addition of water and binder ingredients will result in a buildup of pressure in the column, causing a flow from the top of the column to the exit or outlet means 160 at the bottom of the column, thus sequentially mixing the compartmentally mixed ingredients. The flow from the top to the bottom of the column is noted by the dotted arrows in FIGURE 2 between the stationary baffles 121, 125 and the rotating baffles 131, 135, respectively. In an experimental mixing column a spacing of one-half inch between the stationary and rotating baffles was sufficient to prevent premature interstage mixing to obtain binder stability, yet would allow flow therethrough at a rate so that in approximately one minute an ingredient added in compartment 101 will emerge thoroughly mixed and/or reacted with the other ingredients from outlet 160. With six compartments in the manifold or mixing column this provides an average of approximately ten seconds of thorough mix time in each compartment before the ingredients move to the next compartment for combination with the ingredients in the successive compartment.

To insure a predetermined or fixed progression of ingredients and to prevent possible interstage mixing, a back pressure valve BPV1 is connected to the outlet of the mixing column 100. The back pressure valve has been set at 25 p.s.i. in an experimental model and this has proven satisfactory in combination with the other experiment conditions discussed herein.

As the binder emerges from mixing column 100 via outlet 160 it is passed through transfer line 161 and fill line 162 to a surge reservoir 170. A piping system including conduits 171, 172 and pump 173 constantly circulates the binder in surge reservoir 170 between the reservoir and individual applicator stations to avoid any settling or any other adverse effects from stagnation, temperature, chemical change, etc., and to provide a continuous fresh supply to each station.

Individual ingredients are fed to the inlet valve means by pumping systems form a binder ingredient supply 185 by individual pumping stations, an example of the station fo reach ingredient being noted at 180 in FIGURE 1. A binder pump 181 driven by drive motor 182 is connected to supply a binder ingredient to compartment 106. The binder pump 181 is of the type in which the stroke length of the pump is adjustable so that a variable amount may be delivered by the pump depending upon the length at which the stroke of the pump has been set. A stroke length control is indicated at 183. The components 181, 182 and 183 are commercially available in a package. A Lapp Pulsafeeder, commercially available from Lapp Insulator Company, Inc. is suitable for use in this system.

In order to control the ratio of the ingredients, the stroke lengths of the pumps for each ingredient is adjustable with respect to the other pumps, either manually or in this instance by a computer or master control means 190. Various ratios of the ingredients may be programmed into the data processing or master control unit 190 and expressed in forms of electrical signals supplied via leads 191 and 192 to a station transducer 193 which translates the electrical signal into a control air pressure by regulating pressure supplied from air supply 200 via conduit 201 through transducer 193 and conduit 202 to the stroke length control 183. Transducer 193 may be any suitable air control transducer which is responsive to electrical signals.

The water supplied for the binder is under a separate control. Water from supply 210 is led via conduit 211 and flow control valve means FC-18 to inlet valve means 151a. The flow control valve means FC-18 is responsive to air control signals as follows. Flow indicating transmitter FIT1 measures the flow of water from supply 210 and provides a signal in the form of air pressure via conduit 213 to flow controller FC-34. A set point transducer SP1 supplies an air pressure via conduit 215 to flow controller FC-34, which pressure is set as a result of a signal delivered via leads 195, 196 from data processor 190 according to the initial program requirements for the amount of water in the binder. The flow controller FC-34 compares the set point air pressure and the flow indicating transmitter FIT1 air pressure and, if there is a difference, provides an error signal pressure via conduit 217 which changes the position of flow control valve means FC-18 to vary the quantity of water supplied to inlet valve 151a.

Thus flow of water and binder ingredients are initially set by the data processing unit 190 by providing signals via leads 195, 196 and leads 191, 192. As the level in the surge reservoir 170 lowers because of use at the applicator stations, two methods may be employed to maintain a "finished" binder supply in surge reservoir 170.

To maintain a substantially continuous level is more desirable since binder is then always continuously being mixed in column 100 and continually transferred through the column, line 161, and line 162 to surge reservoir 170 and provides a continual self-cleaning or flushing effect. A transmitter 220 is utilized in conjunction with an air bubbler 220a disposed beneath the surface of the liquid in reservoir 170. When the head or depth of the binder in tank 170 varies the pressure within conduit 225 from air supply 200 varies. This variance in pressure is measured by the transmitter 220 which supplies a signal proportional thereto via leads 221, 222 to the data processing unit 190.

The data processing unit 190 utilizes the transmitter signal to supply control signals via leads 195, 196 and set point transducer SP1 to increase or decrease the flow of water as controlled by flow control means FC-18. Similarly, signals via leads 191, 192 to the stroke air control transducer 193 increases or decreases the supply of binder ingredient from 185 by lengthening or shortening the stroke of pump 181 by adjusting stroke control 183. This may be accomplished within the data processing unit by comparing the signals (analog) or numbers (digital) set by the initial programming with the input signals as numbers (using an analog to digital converter), respectively, received from the transmitter or transmitters. The difference resulting from comparison permits the generation of an output signal or signals.

A signal from the data processing unit 190 via other leads to other binder ingredient pumping stations are similarly changed, but are changed with respect to the total ratio of the ingredients being supplied so that even though a greater volume or quantity of each ingredient is supplied to the mixing column 100 the ratio of all the ingredients remains the same, including their ratio with respect to the water supplied. Thus, the flow of binder to surge reservoir 100 may be controlled to provide a substantially constant level of binder in the surge reservoir 170.

Alternatively, a level control sensing unit LCS may be utilized which is responsive to probes LCS1, LCS2, and LCS3 in surge reservoir 170. A simple on-off control may be actuated in response to probe LCS1 being in air and probe LCS2 being in liquid. That is, binder is used until the level in the reservoir 170 drops below probe LCS1. Contacts in level control sensing unit LCS are actuated to permit the data processing unit 190 to provide signals to the transducers to cause water and binder ingredients to flow until the level in the reservoir 170 reaches probe LCS2. In response to the level reaching probe LCS2, contacts in level control sensing unit LCS stop the production of binder. Therefore, the level control sensing unit LCS causes binder to be supplied from the column 100 to the reservoir 170 upon demand, the time between demands depending upon the rate at which the applicator stations are using binder. The probe LCS3 may be utilized to provide an alarm via the level control sensing unit LCS if the system fails to operate after the level has dropped below that at which the probe LCS1 should have activated the system.

Whichever method is utilized to supply binder from the column 100 to the surge reservoir 170 does not permit a settling of the ingredients in column 100 since the agitator motor 140 is set to run continuously to turn shaft 140a and the attaching agitating blades or paddles 141 through 146 continuously, except for certain circumstances to be discussed hereinafter.

While the system of FIGURE 1 automatically controls water and binder ingredient ratios via the data processing unit or computer 190, it is desirable to be able to manually change the ratio of the water and/or other binder ingredients being transmitted to the column. These manual controls are shown as M1 and M2 in FIGURE 1 and may be connected via switching means SW1 and SW2, respectively, to take over control of the water or binder ingredients being supplied.

Figure 3:
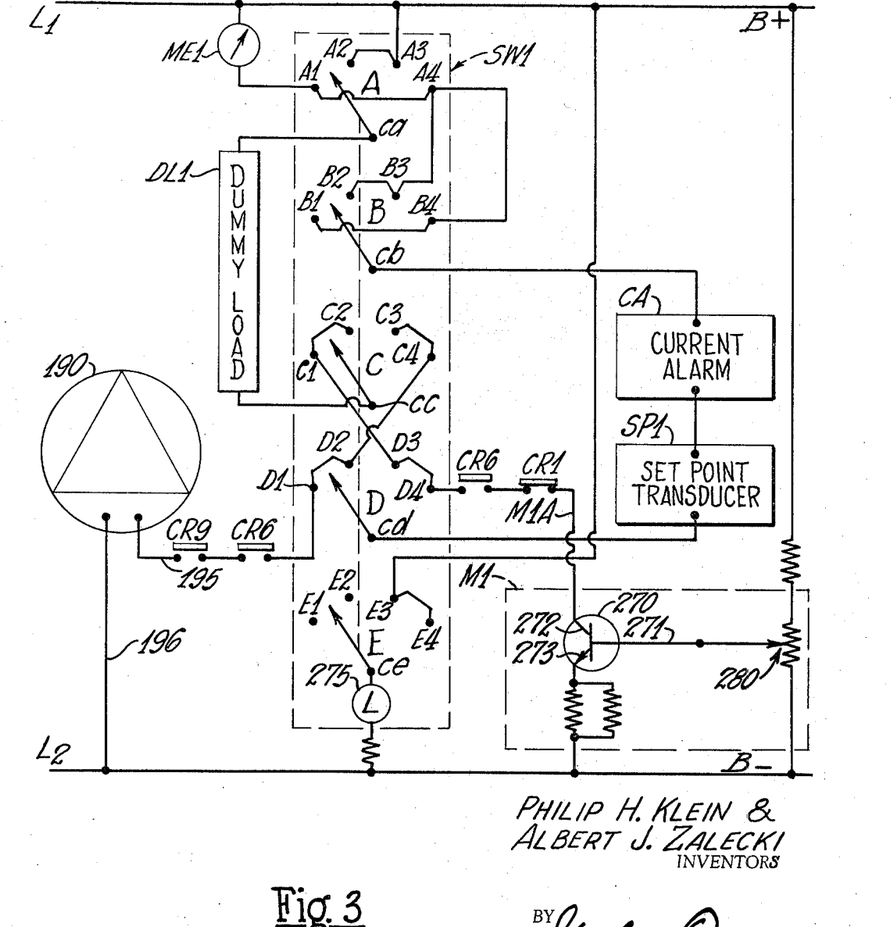
FIGURE 3 is a schematic diagram of control circuitry suitable for use with the system of FIGURE 1.

Referring to FIGURE 3 there is illustrated a schematic diagram of the switching means SW1 and manual control means M1 as utilized in the system of FIGURE 1. In the embodiment shown in FIGURE 3, power may be supplied from leads L1 and L2. The automatic control signal from the computer 190 is indicated as being available to the current alarm unit CA and set point transducer SP1 on leads 195 and 196. For the purposes of the following discussion the contacts CR9 and CR6 in lead 195 and contacts CR6 and CR1 in output lead M1A of manual control M1 are considered to be in their closed positions.

The manual control signal generator M1 utilizes an electronic valve 270 having a control electrode 271, a collector electrode 272 and an emitter electrode 273. The control electrode 271 is connected to an adjustable contact arm of the potentiometer 280. The potentiometer 280 is connected between the power supply leads L1 and L2. Therefore, adjustment of the movable contact arm of the potentiometer 280 changes the bias on the control electrode 271 of the electronic valve 270, regulates the current flow between the electrodes 272, 273 and thus accordingly regulates the magnitude of the manual control signal which is generated.

It is desirable in the system illustrated in FIGURE 1 to not only be able to selectively connect a computer signal or a manual signal to provide control information for the set point transducer SP1, but to be able to compare the magnitudes of the computer and manual signals so that when the signal from either one is switched to the other there will be no "bumping" of the process which may be injurious to the load, to the process, or to the various control components in the process. In order to provide this and other functions a four-position, five-deck switch SW1 is connected in the circuit of FIGURE 3.

The switching means comprises decks A, B, C, D, and E, with movable contact arms in each deck connected to common terminals ca, cb, cc, cd, and ce, respectively. Each deck has four positions I, II, III and IV with contact terminals at these positions designated by the deck number and the corresponding arabic position number such as A1, A2, A3, A4. Since the movable contact arms are ganged together, when the contact arm of deck A is closed with terminal A1 in position I, the contact arm of deck B will be closed with terminal B1, the contact arm of deck C will be closed with terminal C1, etc.

In order to compare the magnitudes of the backup and control signals a meter means ME1 is utilized. The meter ME1 is advantageously a current meter so that there will be no need for providing compensating circuits for drift due to temperature, aging, etc., is as the case with volt meters in similar situations. While the meter ME1 is utilized, as will be noted heretinafter, for comparing the magnitudes of the manually generated signal and the computer signal, the meter means may also be used as a visual readout of the signal to the associated transducer under normal operating conditions and may be calibrated in percent of operation (e.g., valve is 50% operated, etc.).

The following functions are provided by the various positions of the switching means SW1. When the switching means is in the first position or position I, that is with the contact arm making a connection between the terminals A1, ca and terminals B1, cb, etc., the meter ME1 is connected to read the manual signal being generated by M1 in a standby loop and connects the computer signal from 190 to the current alarm CA and set point transducer SP1. In reading the manual signal current flows from the B+ supply of lead L1 through the meter ME1, terminals A1, ca, through electric valve 270. Current flows through dummy load DL1, terminals cc, C1, DR, D4, and through the load or the set point transducer SP1 from the B+ supply via terminals A3, B4, B1, cb, through transducer SP1, terminals cd D1 and through the computer controlled leads 195, 196.

In the second position or postion II of the switching means SW1 the meter is connected to read the computer signal which is still being applied to transducer SP1 and connects the manually controlled signal loop in standby operation. Thus the computer signal flows from the B+ supply through meter ME1, terminals A1, A4, B3, B2, cb, transducer SP1, terminals cd D2, D1, and through computer controlled signals leads 195, 196. The manual control signal generator is connected in a standby loop which begins with the B+ supply and connects through the terminals A3, A2, ca, load DL1, terminals cc, C2, C1, D3, D4, and through the manually controlled signal generator M1.

In the third position or position III of the switch SW1 the meter ME1 is connected into the manually controlled signal loop while the manually controlled signal is being applied to the transducer SP1. The computer signal loop is connected into standby operation. Current flows from the B+ supply through the meter ME1, terminals A1, A4, B3, cb, transducer SP1, terminals cd, D3, D4, and through the manually controlled signal generator M1. The computer signal is connected in the standby operation loop from the B+ supply via terminals A3, ca, dummy load DL1 terminals cc, C3, C4, D2, D1 and through the computer controlled leads 195, 196.

In the fourth position or position IV of the switching means SW1 the meter ME1 is connected to read current in the computer signal loop which is in standby operation, while the manually controlled signal is connected to provide current for the set point transducer SP1. The meter reads current flowing from the B+ supply to the terminals A1, A4, ca, through dummy load DL1, terminals cc, C4, D2, and D1 through the computer controlled leads 195, 196. A signal for the transducer SP1 is supplied from a B+ lead through terminals A3, B4, cb, transducer SP1, terminals cd, D4 and through the manually controlled signal generator M1.

In positions III and IV the contact arm of deck E provides a connection between terminals E3 and E4, which are both connected to the B+ supply, to energize lamp 275 to remind the operator that the process is being operated by the signal from the manually controlled signal generator M1.

There has thus been provided comparing and selecting means which comprises the meter means ME1 and the switching means SW1 which has four states. A first state of the switching means connects the meter means to read the manually controlled signal and selects the computer signal for application through the transducer. A second state of the switching means connects the meter means to read the computer signal and selects the computer signal for application to the load. A third state of the switching means connects the meter means to read the manually controlled signal and selects the manually controlled signal for application to the load. A fourth state of the switching means connects the meter means to read the computer signal and selects the manually controlled signal for application to the transducer.

This enables the comparison of the two signals so that the one signal may be balanced before the switching means is changed from computer signal to the transducer to the manually controlled signal to the transducer, or vice versa. It should be noted that the circuits for checking the magnitude of the signal not then being applied to the load are connected to "balancing" positions I and IV, outside of the actual "load applying" connection positions II and III. This means that the operator must go back from a "balancing" position I through a "load applying" position of the switching means to again compare the magnitude of that signal just set, to the magnitude of the signal currently being applied to the load, before actual transfer. Therefore, an additional safety feature is provided by the switching connections shown in FIGURE 3.

Figure 4:
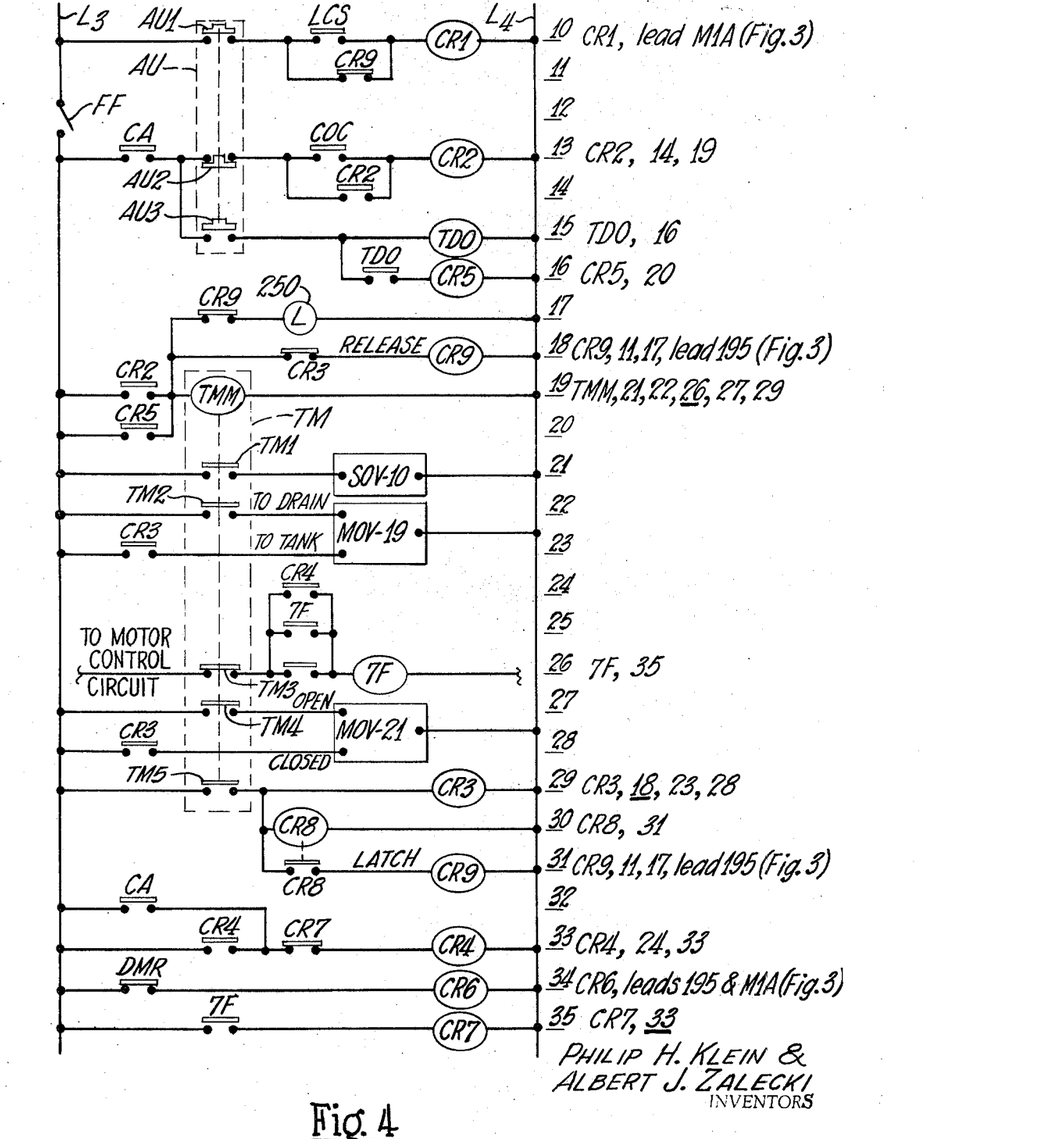
FIGURE 4 is a schematic diagram of control circuitry suitable for use with the system of FIGURE 1.

When there has been no binder flow in the system for a period of time it is desirable to initiate a flush sequence to flush the column 100 and the transfer line 161. Accordingly, there is illustrated in FIGURE 4 a schematic diagram of control circuitry for accomplishing a flush sequence.

It will be noted in the circuit diagram portions of the drawings (FIGURES 4 and 7) that numbered line diagrams have been utilized. The components can be readily located by reference to the line number where the component is positioned. Further, contact switching operations may be noted without designating a mechanical tie between the contact and the actuating means. The contacts may be located at any convenient position, even though quite remote from their actuating means. Cross reference between the actuating means and its associated contacts is easily accomplished by noting in the right hand margin of the drawing the reference character of the actuating means, for example CR3, a motor operated valve repositioning relay, adjacent to line number 29 in FIGURE 4, the line in which contact actuating means CR3 appears. Following the reference character there are noted the line numbers in which CR3 contacts close or open when caused to do so by the actuating means, i.e., line numbers 18, 23 and 28. Other actuating means and their associated contacts are similarly noted. If the contact is one which is a back contact, that is closed when the relay coil is deenergized, the contact line number in the right hand margin is underlined. The CR3 relay has one back contact operation in line 18. Therefore, the number 18 in the right hand margin opposite line 29 is underlined.

The operation of the circuit of FIGURE 4 will first be described when the computer or data processing unit 190 has complete control of the process and an automatic flush sequence is desired. In this mode the control by the computer 190 is attained by placing switching means SW1 in FIGURE 3 in position II, the flush function switch FF in line 12 of FIGURE 4 in a closed position and operation switch AU in lines 10 to 15 of FIGURE 4 in the automatic operation position as shown with contacts AU2 in a closed position in line 13.

The flow of binder in the system may be determined by the current alarm unit CA connected either in lead 195 or 196 from the computer 190 to the set point transducer SP1. The current alarm CA is thus directly sensitive only to the flow of water to column 100, but is indirectly sensitive to the binder flow. A similar current alarm unit could be placed in either of the leads 191, 192 to the stroke air control transducer 193. However, if that particular ingredient were not being used on the binder selected the current alarm CA could not sense the flow of binder. Since water is almost always used in any binder mixing the water flow has been chosen as the indicator. A current alarm suitable for use in this invention is Model 210a available from Transmation, Inc.

Front contacts CA of the current alarm in line 13 of FIGURE 4 close when there is one milliamp input or less to the alarm unit and open when there is more than one milliamp input. Back contacts CA in line 32 open when there is one milliamp input or less to the alarm unit and close when there is more than one milliamp input. If there has been no binder flow for a predetermined period, for example five minutes, flush signal current is supplied through the closed flush function switch FF in line 12, through closed contacts CA, through closed contacts AU2, and closed contacts COC to energize automatic flush relay CR2, all in line 13. Contacts COC in line 13 may be computer operated contacts and provide a ten millisecond closure in response to no binder flow, and thus no output on leads 195, 196, for five minutes. Relay CR2 is thus energized, closing contacts CR2 in line 14 to provide a holding circuit around contacts COC. CR2 contacts also close in line 19 to energize timer motor TMM in timer TM, shown with its associated contacts from lines 19 to 29.

Control of the binder making is removed from the computer 190 at this time by energizing the release coil of the latch trip relay CR9 in line 18 via the previously closed CR2 contacts in line 19. Contacts CR9, in lead 195 of FIGURE 3, open to their released position to prevent the application of a signal from computer 190 to set point transducer SP1. CR9 back contacts close to their released position in line 11 to energize caution light 250 to signal that no switching changes should be made on SW1, SW2, etc., during the flush cycle, and back contacts CR9 are closed to the release position in line 11 for use in the flush sequence when the system is on manual operation. The computer 190 cannot now resume control until the latch coil of CR9 in line 31 is energized at the end of the flush cycle.

Figure 5:
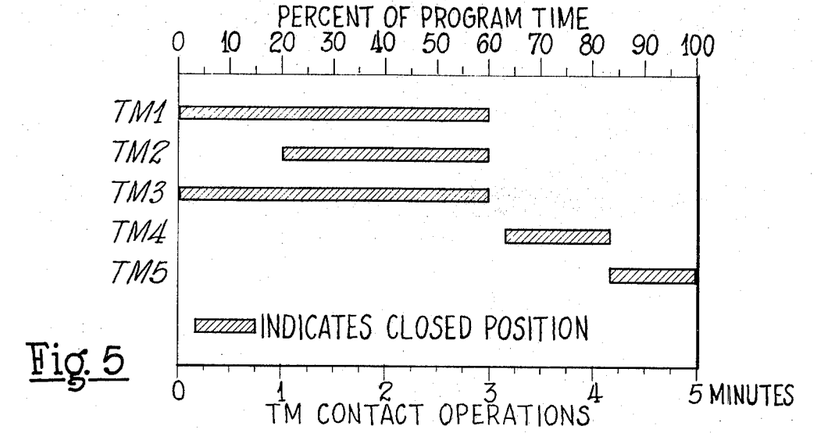
FIGURE 5 is a graphical representation of the operation of programming apparatus shown in FIGURE 4.

The closure of contacts CR2 in line 19 provides power to the flush sequence timer TM which controls the various phases of the flush sequence. The timer may run for any predetermined program period, for example five minutes. Operation of the timer TM contacts is graphically illustrated in FIGURE 5. During the first three minutes contacts TM1 in line 21 close energizing solenoid operated valve SOV–10 which forces flow control valve FC–18 in FIGURE 1 fully opened. This forces binder out of the mixing column 100 and transfer line 161 into the surge reservoir 170. After one minute of water flow through flow control valve FC–18, contacts TM2 in line 22 close to cause motor operated diverter valve MOV–19 to divert flow from the transfer line 161 into the drain adjacent the surge reservoir tank 170.

After three minutes of water flow, contacts TM1 in line 21 open deenergizing solenoid operated valve SOV–10 allowing flow control valve means FC–18 to close, stopping the water flow. Contacts TM2 open in line 22 leaving motor operated valve MOV–19 turned to the drain position. Contacts TM3 open in line 26 deenergizing the mix column agitating motor starter coil 7F, stopping the motor 140. The transfer line 161 is now full of water, so at three minutes and ten seconds after the beginning of the flush sequence, contacts TM4 close in line 27 and energizes motor operated valve MOV–21 to open the transfer line 161 to the drain adjacent the mixing column 100. The line 161 then drains. Thus, binder has been forced into the binder surge tank for one minute, water has been flushed through the mix column and the transfer line for two minutes, and now the transfer line is drained.

At four minutes and ten seconds of the cycle draining will be complete. Timer contacts TM5 in line 29 close energizing repositioning relay CR3. Back contact CR3 in line 18 opens deenergizing the release coil CR9. Front contacts CR3 close in line 23 energizing the motor operated valve MOV–19 to reconnect the transfer line 161 to the surge reservoir tank 170. Front contacts CR3 close in line 28 to energize the motor operated valve MOV–21 to a closed position.

The closing of contacts TM5 in line 29 also energizes a time delay relay CR8 in line 30. After a delay of fifteen seconds, to allow the valves to position themselves, contacts CR8 close in line 31 energizing the latch coil of relay CR9. Contacts CR9 in lead 195 in FIGURE 3 close, signaling the computer that it may resume control of the binder mix and supply. Back contacts CR9 in line 17 open to extinguish lamp 250 to indicate that the flush cycle is over. Back contacts in line 11 open to allow operation by a level control sensor LCS as will hereinafter be described.

The automatic flush cycle is now complete. If binder is required, as signaled by an output from the computer on line leads 195, 196 and/or leads 191, 192 current will flow through transducers SP1 and 193. If binder is required current alarm contacts CA will close in line 32 energizing agitator start relay CR4 in line 33. Contacts CR4 in line 33 close to hold relay CR4 energized to insure that the agitator motor starts and runs even though the binder requirement signal is not steady and does not keep current alarm contacts CA closed in line 32. Contacts CR4 close in line 24 to energize mix column agitating motor starter coil 7F in line 26 through the closed back contacts TM3 of the timer TM. The agitator motor then continues to run until another flush cycle is called for by the computer. When binder flow resumes the timer TM is reset by the current alarm contact CA in line 13 which opens CR2 contact in line 19 removing power from the timer TM.

The energization of the mix column agitating motor starter coil 7F in line 26 closes contacts 7F in line 35 energizing reset relay CR7. Back contacts CR7 open in line 33 resetting the agitator start relay CR4.

If one of the binder proportioning unit drive motors, such as motor 182 in FIGURE 1, should stop, relay DMR in FIGURE 1 which is sensing the running of drive motor 182 will be deenergized and DMR contacts in line 34 of FIGURE 4 will open, deenergizing relay CR6. Front contacts CR6 in leads 195 and M1A in FIGURE 3 will open signaling both the computer and the manual control signal generator that binder cannot be made. The relay DMR is thus representative of means for detecting a lack of response of a selected operation in said apparatus. The CR6 contacts then interrupt operation of the entire apparatus. Similarly, relays may be used to detect a lack of response of any other selected operation in the entire apparatus. The automatic flush sequence will then be initiated, if the system is not already in the flush cycle, and after five minutes have elapsed the system will flush and stop operation.

The system may be changed to manual control of the amount of water and/or individual binder ingredients by changing switches SW1, SW2, etc., to position III. This places the set point transducer SP1 and the stroke air control transducers 193 under control of the manual signal generating units M1, M2, etc. Signals from the computer on leads 195, 196 and leads 191, 192 cannot now be applied to the transducers. Binder mixing now is strictly "on-off" controlled by off-on relay CR1 in line 10 of FIGURE 4, on signal from the level probes LCS1 and LCS2 via the level control sensing unit LCS in FIGURE 1. Since relay CR9 is in the latched position, back contacts CR9 in line 11 are open allowing control of the relay CR1 in line 10 to be made directly by LCS contacts from the level control sensing unit in FIGURE 1. The LCS contacts in line 10 close when the upper probe is in liquid, energizing relay CR1 and opening CR1 contacts in lead M1A in FIGURE 3 thus stopping the flow of current to the set point transducer SP1 and stopping the flow of water. Similarly, CR1 contacts interrupt the supplying of binder ingredients to the mixing column 100. When the lower probe LCS1 is in the air the contacts LCS open deenergizing relay CR1 and allowing back contacts CR1 in lead M1A in FIGURE 3 to close, permitting the application of the signal as manually set by potentiometer 280 to the transducers.

In order to operate in the manual position the switch AU is operated to close contacts AU1 in line 10, open contacts AU2 in line 13, and close contacts AU3 in line 15.

The flush sequence is again initiated by five minutes of non-flow. This is signaled by the current alarm contacts CA in line 13 closing and remaining closed. If the contacts CA remain closed for five minutes in line 13, time delay operator TDO in line 15 closed TDO contacts in line 16 to energize "on-off" flush relay CR5. Front contacts CR5 close in line 20 to supply power to the timer motor TM, to energize the release coil of relay CR9 in line 18 and to again initiate the flush sequence set forth hereinbefore. To insure that no binder requirement signal is applied to the "off-on" relay CR1, contacts CR9 in line 11 close to their release position energizing relay CR1 and opening contacts CR1 in lead M1A in FIGURE 3. "On-off" control of binder mixing by the relay CR1 is returned to the level probes LCS1, LCS2, when the opening of CR3 contacts in line 18 deenergizes release coil CR9. Contacts CR9 open in line 11 returning control of relay CR1 to LCS contacts in line 10.

Referring to FIGURES 6, 7, 8 and 9 there is illustrated another continuous mix system embodying the teachings of this invention.

Figure 6:
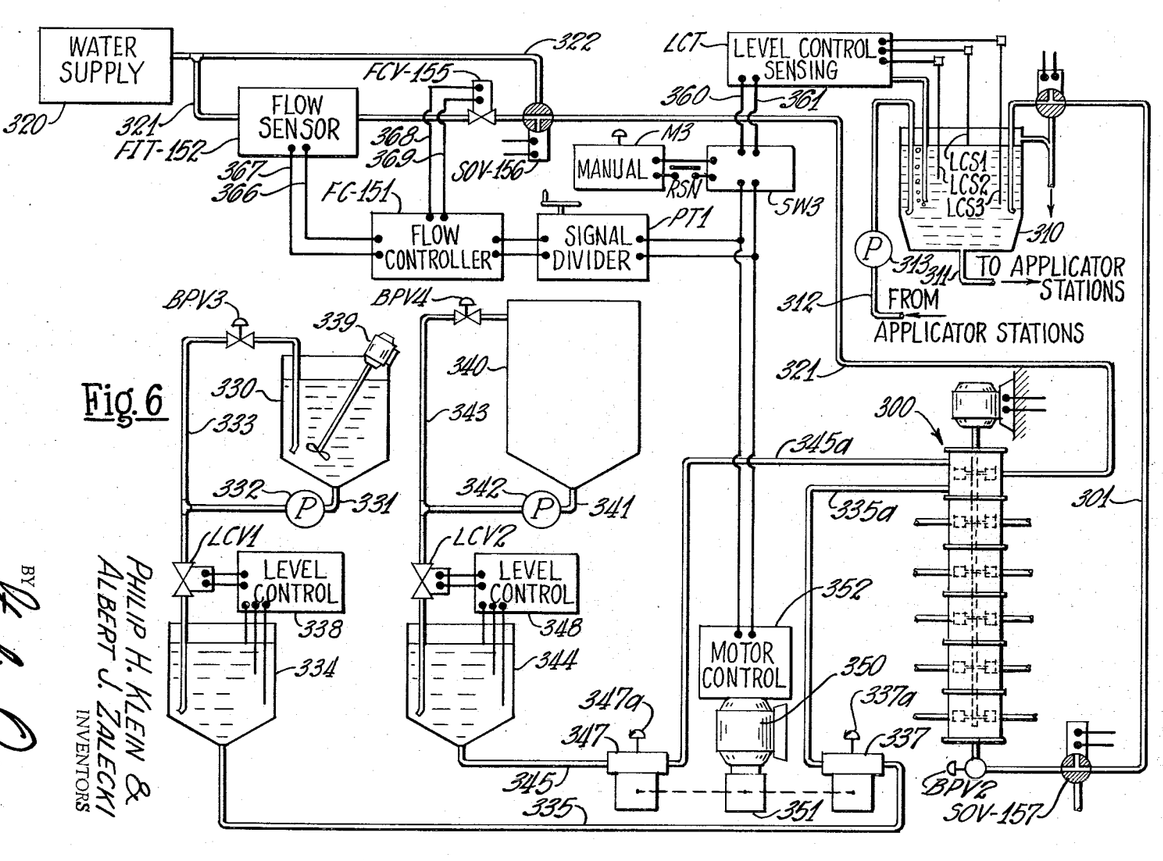
FIGURE 6 illustrates in block diagram form a second embodiment of the teachings of this invention.
Figure 7:
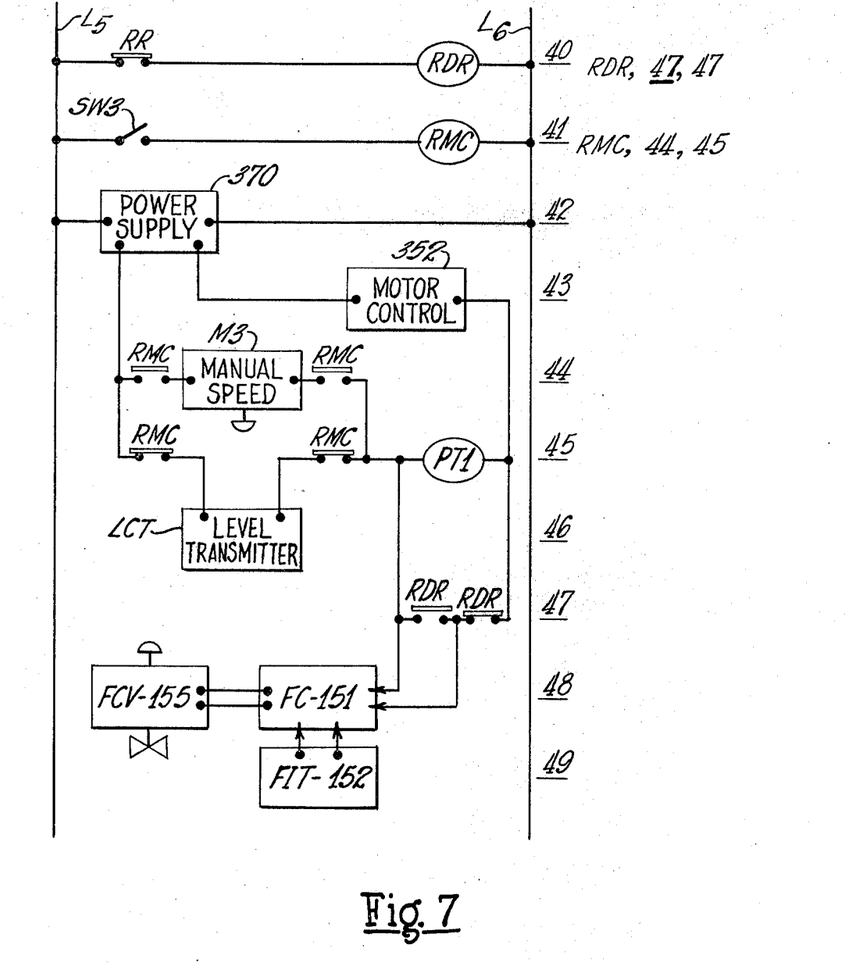
FIGURE 7 is a schematic diagram of control circuitry suitable for use with the system of FIGURE 6.
Figure 8:
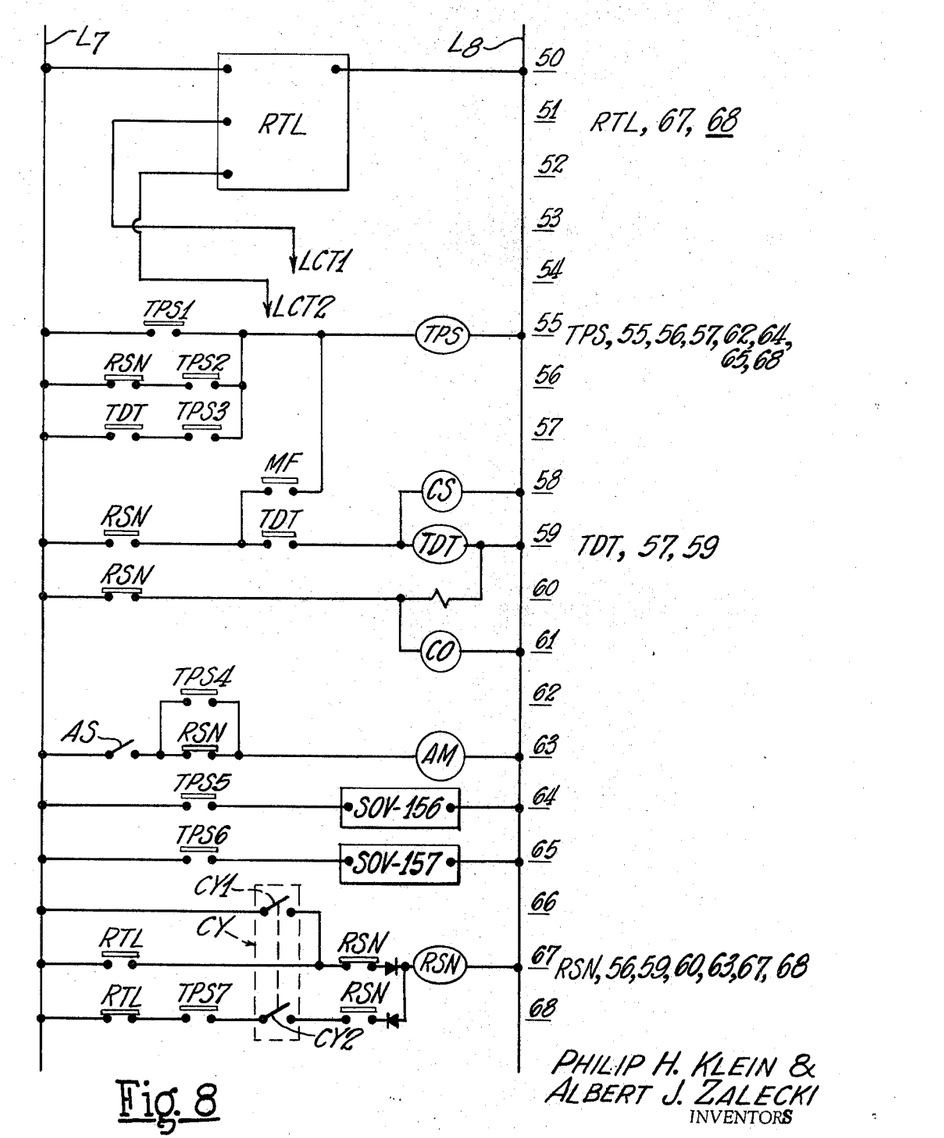
FIGURE 8 is a schematic diagram of control circuitry suitable for use with the system of FIGURE 6.
Figure 9:
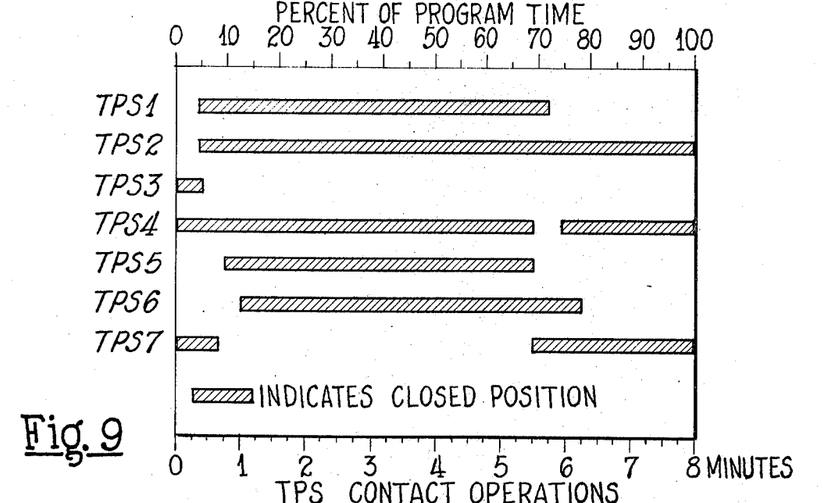
FIGURE 9 is a graphical representation of the operation of programming apparatus shown in FIGURE 8.

FIGURE 6 illustrates the system and its operation in diagrammatic form. FIGURE 7 is a schematic wiring diagram outlining the controls of the system of FIGURE 6. FIGURE 8 is a schematic wiring diagram of further controls and the flush sequence controls for the apparatus of FIGURE 6. FIGURE 9 is a graphical illustration of the operation of the program contacts for the flush sequence control illustrated in FIGURE 8.

Referring to FIGURE 6 there is a mixing column or manifold indicated generally at 300 which may be constructed and operated in the same manner as described hereinbefore for the mixing column 100. Binder is supplied from the column 300 through back pressure valve BPV2, solenoid operated drain valve SOV–157, and transfer line 301 to surge reservoir tank 310. A piping system including conduit 311, conduit 312, and pump 313 is connected to circulate "finished" binder from surge reservoir tank 310 to and from individual applicator stations.

Water is supplied to column 300 from source 320 via conduit 321 and flow control valve FCV–155. Binder ingredients which must be premixed are supplied from premix tanks such as indicated at 330 which have a piping system including conduit 331, pump 332, conduit 333, and back pressure BPV3 for circulating the batch in tank 330 to prevent the ingredients from settling and to maintain a fresh supply in conduit 333 for the surge reservoir 334. Back pressure valve BPV3 maintains a pressure in conduit 333 so that binder may be supplied on demand through valve LCV1 in response to a signal from level control 338. An agitator 339 may also be utilized to keep the ingredients in tank 330 thoroughly mixed. A conduit 335 leads from the surge reservoir tank 334 to metering pump 337.

For ingredients that do not need premixing a supply tank 340 is provided which has a piping system including conduit 341, pump 342, conduit 343 and back pressure valve BPV4 to provide a continuous and fresh supply in conduit 343. Back pressure valve BPV maintains a pressure in conduit 343 so that the binder ingredient may be supplied under pressure through valve LCV2 upon demand by the level control 348 to surge tank 344. A conduit 345 conducts the binder ingredient from surge tank 344 to metering pump 347. Conduits 335a and 345a conduct the binder ingredients from pumps 337 and 347, respectively, to the mixing column 300.

In the system illustrated the metering pumps 337 and 347 may be of the same type illustrated in FIGURE 1. In FIGURE 6 provision is made via manual adjustment 337a and 347a for manual adjustment of the stroke length of the pumps to set the ratio of the ingredients supplied to the column 300. The pumps are driven by a variable speed DC motor 350 which is connected or linked to all of the binder ingredient pumps via gear box 351. The speed of the variable speed motor is controlled by motor control 352. Thus after the ratios of the binder ingredients have been set manually, the speed of the motor 350 may be varied to increase or decrease the volume or quantity of all of the binder ingredients to mixing column 300 while maintaining the ratio desired.

The speed of the motor may be controlled automatically by making motor control 352 responsive to the transmitter section of the level probe-transmitter unit LCT. The transmitter section has a bubbler sensor disposed beneath the surface of the binder in reservoir tank 310 and is adapted to provide a signal on leads 360, 361 which is proportional to the amount of binder required to return the level to a desired point in tank 310.

The amount of water supplied to the column 300 may be determined automatically by comparing the signal from leads 360 and 361 of the LCT transmitter with signals on leads 366 and 367 provided by flow indicating transmitter 152 in the internal circuits of flow controller FC–151. A differential signal generated by flow controller FC–151 on leads 368 and 369 is supplied to flow control valve FCV–155 to determine the amount of water required by mixing column 300. In order to set the ratio of water supplied, to a certain percentage of the binder ingredients supplied, an adjustable signal divider or potentiometer PT1 may be interposed between the flow controller FC–151 and the transmitter section of unit LCT. The signal can then be adjusted to a desired proportion of that actually transmitted from the unit LCT.

It is also desirable to have the opportunity to control the system manually. Therefore switching means SW3 is provided which, when operated, disconnects the transmitter section of the unit LCT and connects manual control unit M3 to supply signals to motor control 352 and flow controller FC–151.

Referring to FIGURE 7 there is illustrated in lines 40 to 49 a schematic circuit for controlling the system illustrated in FIGURE 6. Drive relay RDR in line 40 is energized and maintained energized by closed contacts RR as long as motor 350 is running. Thus front contact RDR is closed in line 47 to connect the signal from potentiometer PT1 in line 45 to flow controller FC–151 in line 48. Back contact RDR is open so that a shunt circuit is not inhibiting the signal from potentiometer PT1 from reaching flow controller FC–151.

A signal from power supply 370 in line 42, the magnitude of which is controlled by level transmitter in line 46, is supplied via back contacts RMC in line 45 through potentiometer PT1 to motor control 352 in line 43. The potentiometer or signal divider PT1 in line 45 similarly supplies a proportional part of that signal via closed front contacts RDR in line 47 to flow controller FC–151 in line 48 for the functions hereinbefore described.

If it is desired to control the speed of the motor manually, switch SW3 in line 41 is closed energizing manual control relay RMC. Back contacts RMC in line 45 open disconnecting level transmitter LCT from control of the circuit. Front contacts RMC in line 44 close connecting manual speed control M3, which may be a potentiometer, in series with the power supply 370 to control the magnitude of the signal supplied to the motor control 352 and to the flow controller FC–151.

If completely automatic control of the system is desired then a data processing unit such as 190 in FIGURE 1 may be utilized to set the ratio of each of the ingredients per the apparatus shown in FIGURE 1 and may be substituted for the potentiometer PT1 for controlling the amount of water flow, both controls being responsive to the output of the transmitter section of the LCT unit on leads 360, 361.

As disclosed hereinbefore it may also be desirable for the surge reservoir tank 310 to be supplied by a "on-off" control by level detecting probes LCT1 and LCT2 connected to the level probe-transmitter unit LCT. Referring to FIGURE 8 this may be accomplished by providing a tank level relay apparatus RTL as shown in line 51 which has RTL contacts in line 67 which close when the high level probe LCT1 is immersed in liquid and remain closed until the low level is reached, and contacts RTL in line 68 which close when the lower probe LCT2 is in the air and remain closed until the high level is reached. Therefore, the RTL contacts in lines 67 and 68 may control a latch-trip relay RSN in line 67. Contacts of the relay RSN may be utilized as shown in conjunction with manual control M3 in FIGURE 6 for setting the system for a "off-of" control on demand by probes LCT1 and LCT2 of the level probe unit LCT.

It is again desirable to provide a flush sequence for the sytem shown in FIGURE 6. An automatic flush sequence for the "off-on" mode of control will be described. In this mode the cycling switch CY will have CY1 switch contacts open in line 66 and CY2 contacts closed in line 68. The agitator motor start contacts AS in line 63 will be closed.

If the liquid in surge reservoir 310 drops past the low level probe LCT2, RTL contacts in line 68 close. Timer back contacts TPS–7 in line 68 are already closed as are the RSN contacts in this line since relay RSN is in the latched position. Half wave current flows through the closed contacts in line 68 and the rectifier therein and through relay coil RSN in line 67 in the "trip" direction. Upon the tripping of the relay coil RSN contacts in line 68 open to remove the "trip" current, RSN contacts in line 67 close to ready RSN coil for future latch current, RSN contacts in line 63 close to complete an agitator start circuit, RSN contacts in line 60 close to reset the timer TDT in line 59 and illuminate light CO in line 61 to note that binder is being mixed, RSN contacts in line 59 open to prevent manual flush operation by closure of MF contacts in line 58, RSN contacts close in line 56 to provide reset current for the timer TPS, RSN contacts controlling the operation of the manual unit M3 in FIGURE 1 close to start the binder ingredient and water flow, and RSN contacts may close elsewhere to energize various alarm circuits that are checking for proper flow and operation of water and ingredients, and other alarm indicating areas.

In response to the closure of the RTL contacts in line 68 binder is supplied via mixing column 300 to surge reservoir tank 310 until the upper or high probe LCT1 is in liquid. Then the RLT contacts in line 68 open and RTL contacts in line 67 close and stay closed until the low level probe is in the air. Half wave current flows through the RSN coil in line 67 in the "latch" direction through RSN contacts in line 67 which were closed from previous "trip" current action. Then RSN contacts in line 68 close to ready the RSN coil for future "trip" current, RSN contacts in line 67 open removing "latch" current from the RSN coil, RSN contacts in line 63 open to remove current from the agitator starter circuit, RSN contacts in line 60 open to reset timer TDC and to extinguish light CO, RSN contacts in line 59 close to permit manual flush operation by MF contacts in line 58 and to illuminate caution light CS also in line 58 if TDT contacts in line 59 are closed, RSN contacts open in line 56 to prevent a reset of the program sequence timer TPS in line 55 via TPS2 contacts, RSN contacts in FIGURE 6 open to signal the manual unit M3 that binder is no longer required, and RSN contacts elsewhere may open to deenergize the alarm circuits.

Automatic flush can occur only when the RSN relay is latched, indicating that binder is not being supplied by the mixing column 300. After a predetermined length of time the TDT relay in line 59 times out, closing TDT contacts in line 59 to turn caution light CS on to indicate that the flush sequence is in operation and that no switching changes should be made, and TDT contacts close in line 57 to energize program sequence timer TPS through already closed TPS3 back contacts.

The operation of the TPS series of contacts is shown graphically in FIGURE 9. When the program sequence timer TPS is energized TPS1 contacts in line 55 close after 20 seconds to provide a holding circuit for continued operation of the timer, TPS2 contacts close in line 56 after 20 seconds to ready the timer TPS for reset after the flush sequence. TPS3 contacts open in line 57 after 25 seconds to deenergize the TPS starting circuit. TPS4 contacts in line 62 have been closed from the start of flush sequence to insure that the agitator starter circuit is energized. TPS5 contacts in line 64 close after 45 seconds to energize the solenoid operated valve SOV–156 to push water into the top of column 300 and binder from the line into the surge tank. TPS6 contacts in line 65 close after one minute to energize the solenoid operated valve SOV–157 to open the column 300 and transfer line 301 to the drain. TPS7 contacts in line 68 open after 40 seconds to prevent the low level probe from tripping the RSN coil and reversing the position of the RSN contacts.

Five and one-half minutes after the flush sequence starts TPS5 contacts in line 64 open to deenergize solenoid operated valve SOV–156 and stop the flush water flow into the column 300, TPS4 contacts open in line 62 to stop the agitator motor, and TPS7 contacts close in line 68 to ready the "trip" circuit of the RSN relay coil for the low level probe. Five minutes and forty-five seconds after the start of the flush sequence TPS1 contacts open removing the holding circuit for TPS. Five minutes and fifty-five seconds after the start of the flush sequence TPS4 contacts close to reenergize the agitator motor starting circuit. Six minutes and fifteen seconds after the start of the flush sequence TPS6 contacts in line 65 open to denenergize solenoid operated drain valve SOV–157 to close the drain and the flush cycle is over.

If the cycle switch CY in line 66 to 68 is turned to the stop position, that is CY1 contacts closed and CY2 contacts open, then if the RSN relay is already in the latched position and a manual flush can be initiated and the system will stop, or after a period of time the automatic flush sequence will be initiated and the system will stop. If the RSN relay coil is tripped, then latch current will be provided through CY1 contacts to latch the RSN relay and ready the RSN contacts for a manual flush sequence if desired, or, after a predetermined period of time, for an automatic flush sequence, the system then stopping.

There has thus been described hereinbefore apparatus for mixing and supplying a "final mixture" of binder, size or the like which comprises means for sequentially combining ingredients to provide a desired final mixture which includes a plurality of compartments having limited flow communication therebetween to permit serial flow from a first to a last one of the compartments. Ingredients are supplied under pressure to the compartments. The ingredients are stirred or agitated in each compartment. Outlet means is provided from the last compartment. Means are provided for controlling the ratio of each ingredient supplied with respect to the remaining ingredients supplied. Means responsive to the demand for the final mixture controls the total volume of ingredients supplied.

The ratio controlling means may include variable delivery means and means for adjusting the amount delivered by the variable delivery means. The delivery means advantageously are pumps having an adjustable stroke length. A single driving means may be connected to drive all of the pumps and may have a speed control means responsive to the total volume control means for determining the total volume supplied.

A master control means such as a computer or other data processing unit may be utilized for providing a signal proportional to the ratio of each ingredient required to the adjustment means of each variable delivery means. The master control means may be responsive to the total volume control means to change all master signals a proportional amount to vary the total volume of ingredients without varying the ratio of ingredients.

Water may be supplied to the first compartment of the manifold by a control means, separate from the ingredient control means, which controls both total volume and ratio.

Surge reservoir means is advantageously connected to receive the final mixture from the outlet of the last compartment. The demand responsive means may include means for sensing level of the mixture in the surge reservoir. The sensing means may provide a demand signal in response to a predetermined low level. Alternatively, the sensing means may provide a continuous demand signal which varies in magnitude as the level in the reservoir varies.

The apparatus may further include means for detecting a lack of demand for the final mixture for a predetermined period and providing a flush signal in response thereto. Means responsive to the flush signal may interrupt the supply of ingredients to the compartments, supply a flush liquid under pressure to the compartments, divert liquid from the surge reservoir, maintain the agitator means running during the flush period, and provide an end-of-flush signal for terminating the flush sequence or period and the activities carried out therein.

The ingredient combining means advantageously comprises a column or manifold divided into successive compartments by successively disposed and separated baffle means. A drive shaft may extend through the compartments having agitator means such as turbine blades or paddles for each compartment mounted thereon. Each baffle means may include a stationary outer baffle supported within the manifold and having a central opening formed therein and further may include an associated central baffle mounted on the drive shaft and positioned to control flow between compartments through the central opening.

In summary there has been disclosed herein a method of and apparatus for mixing and supplying a mixture which is particularly useful for a mixture that is subject to deterioration in quality after being mixed. Ingredients are continuously combined into a final mixture in a manifold. A small surge storage of fresh final mixture is maintained. The fresh final mixture is supplied from the surge storage to one or more application stations. The lack of demand for the final mixture may be detected to interrupt the combination of ingredients and to flush and clean the manifold. A sufficient supply of final mixture is maintained in surge storage to accommodate a demand for final mixture during a flush period.

While specific arrangements have been shown to fully disclose the operation of the invention, it is apparent that modifications may be made other than those described. The present disclosure is illustrative of preferred embodiments, the invention comprehending all variations within the scope of the disclosure.

We claim:

1. Apparatus for mixing and supplying a final mixture of binder, size or the like comprising means for sequentially combining ingredients to provide a desired final mixture including a plurality of compartments, means for providing limited flow communication between said compartments to permit serial flow from a first of said compartments through the other compartments to a last one of said compartments, means for supplying ingredients under pressure to said compartments, means for mixing ingredients in each compartment, and outlet means for said last one of said compartments; means for controlling the ratio of each ingredient supplied with respect to the remaining ingredients supplied; and means responsive to the demand for said final mixture for controlling the total volume of ingredients supplied.

2. Apparatus as defined in claim 1 in which said ratio controlling means includes variable delivery means and means for adjusting the amount delivered by said variable delivery means.

3. Apparatus as defined in claim 2 which further includes master control means for providing a signal proportional to the ratio of each ingredient required to said adjustment means of said variable delivery means for each ingredient.

4. Apparatus as defined in claim 3 in which said master control means is responsive to said total volume control means to change all signals a proportional amount to vary the total volume of ingredients without varying the ratio of ingredients.

5. Apparatus as defined in claim 2 in which said variable delivery means are pumps and in which said adjustable means includes means for varying the length of the stroke of each pump to vary the amount delivered thereby.

6. Apparatus as defined in claim 5 which further includes a single driving means connected to drive all of said pumps, speed control means for said driving means responsive to said total volume control means.

7. Apparatus as defined in claim 1 which further includes means for supplying water to said manifold and means for controlling the amount of water supplied.

8. Apparatus as defined in claim 7 which further includes means for controlling the ratio of water supplied.

9. Apparatus as defined in claim 1 in which water supply means is connected to said first compartment.

10. Apparatus as defined in claim 1 which further includes surge reservoir means connected to said outlet means, and in which said demand responsive means includes means for sensing level of the mixture in said surge reservoir means.

11. Apparatus as defined in claim 10 in which said sensing means provides a demand signal in response to a predetermined low level.

12. Apparatus as defined in claim 10 in which said sensing means provides a continuous demand signal which varies in magnitude as the level in said reservoir varies.

13. Apparatus as defined in claim 1 which further includes means for detecting the lack of demand for said final mixture for a predetermined period and providing a flush signal in response thereto, means responsive to said flush signal for interrupting the supply of ingredients to said compartments, and means responsive to said flush signal for supplying a flushing and cleaning liquid under pressure to said compartments.

14. Apparatus as defined in claim 13 which further includes surge reservoir means connected to said outlet means and means responsive to said flush signal for diverting liquid from said surge reservoir means.

15. Apparatus as defined in claim 13 in which the operation of said diverting means is delayed until said flushing liquid pushes part of said final mixture remaining in said compartments and outlet means into said surge reservoir.

16. Apparatus as defined in claim 13 in which said mixing means is responsive to said flush signal to agitate said flushing and cleaning liquid in said compartments.

17. Apparatus as defined in claim 13 which further includes timing means responsive to said flush signal for providing an end of flush signal a predetermined time after receipt of said flush signal, said flush liquid supplying means being responsive to said end of flush signal to terminate flow of said flush liquid.

18. Apparatus for sequentially combining ingredients to continuously provide a desired final mixture comprising a plurality of compartments, means for providing limited flow communication between said compartments to permit serial flow from a first of said compartments through the other compartments to a last one of said compartments, means for supplying ingredients under pressure to said compartments, means for mixing the ingredients in each compartment, outlet means for said last one of said compartments to permit issuance of a final mixture, and means responsive to the demand for said final mixture for controlling the total volume of ingredients supplied.

19. Apparatus for sequentially combining ingredients to continuously provide a desired final mixture comprising a plurality of compartments, means for providing limited flow communication between said compartments to permit serial flow from a first of said compartments through the other compartments to a last one of said compartments, means for supplying ingredients under pressure to said compartments, agitator means for each compartment, and outlet means for said last one of said compartments to permit issuance of a final mixture, said plurality of compartments comprising a manifold having successively disposed baffle means therein to divide said manifold into said plurality of compartments, a drive shaft extending through said compartments, said agitator means for each compartment comprising agitator blade means for each compartment mounted on said drive shaft, each baffle means including a stationary baffle having a central opening formed therein and supported in said manifold and an associated disc shaped baffle mounted on said drive shaft within the opening defined in said stationary baffle.

20. Apparatus as defined in claim 19 in which said limited flow communication between said compartments is provided between the stationary and the disc shaped baffles of each baffle means.

21. Apparatus for sequentially combining ingredients to continuously provide a desired final mixture comprising a plurality of compartments, means for providing limited flow communication between said compartments to permit serial flow from a first of said compartments through the other compartments to a last of said compartments, means for supplying ingredients under pressure to said compartments, agitator means for each compartment, and outlet means for said last one of said compartments to permit issuance of a final mixture, and means for maintaining a back pressure at said outlet means to insure that the ingredients stay within each compartment for a predetermined average time for thorough mixing.

22. Apparatus for mixing and supplying a final mixture of binder, size or the like comprising a manifold divided into a plurality of successive compartments by successively disposed and separated baffle means, a drive shaft extending through said compartments, agitator means for each compartment mounted on said drive shaft, each baffle means including a stationary outer baffle supported within said manifold and having a central opening formed therein and further including an associated central baffle mounted on said drive shaft and positioned to control flow between said compartments through said central opening, means for supplying ingredients under pressure to said compartments, means for supplying water under pressure to the first of said successive compartments, outlet means for the last of said successive compartments, means for controlling the ratio of each ingredient and water supplied, and means for responsive to a demand for final mixture from said outlet means for controlling the total volume of ingredients and water supplied to said manifold.

23. Apparatus as defined in claim 22 which further includes means for maintaining a back pressure at said outlet means to insure that ingredients stay within each compartment for a predetermined average time for thorough mixing.

24. Apparatus as defined in claim 22 in which said ingredient ratio controlling means includes variable stroke length pumps.

25. Apparatus as defined in claim 24 which further includes master control means for providing a signal for each ingredient which is proportional to the ratio of that ingredient required, and which further includes means for each pump responsive to an ingredient signal from said master control means for adjusting the stroke length of the associated pump.

26. Apparatus as defined in claim 25 in which said water ratio controller includes flow controller means responsive to a water ratio signal supplied by said master control means.

27. Apparatus as defined in claim 26 in which said master control means is responsive to said total volume control means to change all signals a proportional amount to vary the total volume of ingredients and water without varying the ratio of ingredients.

28. Apparatus as defined in claim 25 which further includes manual control means for generating selected magnitudes of signals to control the ratio and volume of water and ingredients, and switching means for selecting one of said manual control means and master control means.

29. Apparatus as defined in claim 24 which further includes a single driving means for said ingredient pumps and speed control means for said driving means responsive to said total volume control means.

30. Apparatus as defined in claim 29 which further includes means for manually adjusting the stroke length of said variable pumps.

31. Apparatus as defined in claim 29 which further includes master control means for providing a signal for each ingredient which is proportional to the ratio of that ingredient required, and which further includes means for each pump responsive to an ingredient signal from said master control means for adjusting the stroke length of the associated pump.

32. Apparatus as defined claim 29 which further includes means for manually controlling said speed control means, and further includes means for selecting connecting one of said manual control and said total volume control means to said speed control means.

33. Apparatus as defined in claim 22 which further includes means for detecting no demand for said final mixture for a predetermined period and providing a flush signal in response thereto, and means for flushing and cleaning said manifold in response to said flush signal.

34. Apparatus as defined in claim 33 in which said flushing means includes programming means responsive to said flush signal to interrupt the operation of said ratio controlling and total volume controlling means.

35. Apparatus as defined in claim 34 in which said programming means is operative to connect said water supplying means to provide flush water to said manifold.

36. Apparatus as defined in claim 35 in which said outlet means includes a transfer line and which further includes a surge reservoir to receive final mixture from said transfer line, drain valve means in said transfer line, means responsive to said programming means for opening said drain valve means a predetermined time after said flush signal is provided.

37. Apparatus as defined in claim 36 in which said programming means at the end of a predetermined flush period restores operation of said ratio controlling and total volume controlling means, disconnects said water supplying means from said manifold, and closes said drain valve in said transfer line.

38. Apparatus as defined in claim 35 which further includes means for manually providing a flush signal.

39. Apparatus as defined in claim 22 which further includes means for detecting lack of response of a selected operation in said apparatus, and means responsive to said response detecting means for interrupting operation of the entire apparatus.

40. A system for mixing and supplying a mixture subject to deterioration in quality after being mixed comprising means for continuously combining ingredients into a final mixture in a manifold, means for controlling the ratio of each ingredient supplied with respect to the remaining ingredients supplied intermediate surge storage means for storing a predetermined small quantity of said freshly combined final mixture, and means for supplying fresh final mixture from said intermediate surge storage means to an application station.

41. A system for mixing and supplying a mixture subject to deterioration in quality after being mixed comprising means for continuously combining ingredients into a final mixture in a manifold, intermediate surge storage means for storing a predetermined small quantity of said freshly combined final mixture, means for supplying fresh final mixture from said intermediate surge storage means to an application station, means for detecting a lack of demand for a predetermined period, and means responsive to said demand lack detecting means for interrupting said ingredient combining means for a flush period and flushing and cleaning said manifold.

42. A system as defined in claim 41 in which the capacity of said surge storage means is sufficient to supply final mixture to an application station in the event of demand for final mixture during said flush period.

43. A method of mixing and supplying a mixture subject to deterioration in quality after being mixed comprising the steps of continuously combining ingredients into a final mixture in a manifold means into a final mixture, maintaining a small surge storage of fresh final mixture, supplying said fresh final mixture from said surge storage to an application station, and controlling the total volume of ingredients supplied to said manifold in response to the demand for said final mixture.

44. A method of mixing and supplying a mixture subject to deterioration in quality after being mixed comprising the steps of continuously combining ingredients into a final mixture in a manifold means into a final mixture, maintaining a small surge storage of fresh final mixture, supplying said fresh final mixture from said surge storage to an application station, detecting a lack of demand for final mixture, interrupting the combination of ingredients in said manifold for a flush period, and flushing and cleaning said manifold.

45. A method as defined in claim 44 which includes the further step of maintaining a sufficient fresh supply of final mixture in surge storage to accommodate a demand for final mixture during a flush period.

46. A process of making a formed mass of glass fibers held together in the mass by the reaction product of a plurality of ingredients that deteriorate in quality a short time after mixing comprising the steps of forming a plurality of glass fibers, gathering said fibers into a mass, maintaining a fresh supply of binder by mixing a plurality of ingredients into a binder by flowing at least one ingredient as a stream through a number of zones in serial intercommunication and adding other ingredients to said flowing ingredient stream in sequence at each of said zones, and holding said fibers together in a mass by applying said fresh binder mixture from the last of said zones to the fibers as they are gathered together in the mass.

47. A process as defined in claim 46 which includes collecting the fresh mixture of all of the ingredients flowing from the last of said zones in a surge reservoir for distribution to a plurality of binder applicator stations.

48. A process as defined in claim 46 in which the quantity of binder mixed by said ingredient stream is regulated to provide a substantially continuous stream of fresh binder in response to the demand for binder for application to said fibers.

49. A process as defined in claim 46 which includes the further step of agitating said ingredient stream as it flows through each zone.

50. A process as defined in claim 49 in which said agitation is accomplished by moving mixing blades in each zone.

51. A process as defined in claim 46 in which proper interaction of ingredients within each zone is assured by providing a compartment for each zone and serially interconnecting said compartments by passageways sufficiently small to prevent premature interzone mixing.

References Cited

UNITED STATES PATENTS

| | | | |
|---|---|---|---|
| 2,475,191 | 7/1949 | Marvin | 259—66 X |
| 2,850,467 | 9/1958 | Livingood | 259—66 |
| 3,194,638 | 7/1965 | Neuville | 259—8 X |

ROBERT W. JENKINS, Primary Examiner